Feb. 4, 1958   M. HIMMELHEBER ET AL   2,822,028
METHOD OF MANUFACTURING WOOD PARTICLE BOARDS
Filed Jan. 16, 1956   4 Sheets-Sheet 1
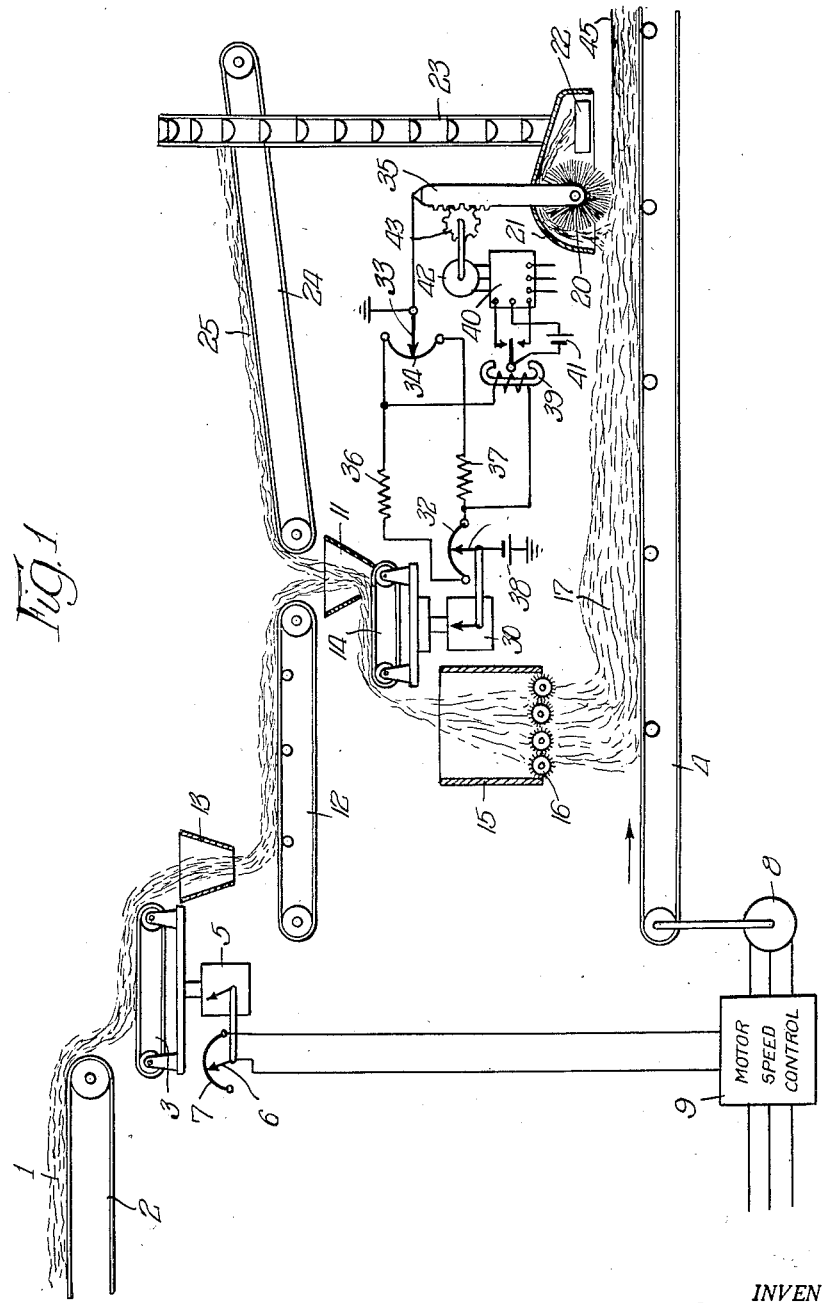
INVENTORS.
Max Himmelheber,
BY Klaus Steiner,
George H. Simmons
Atty Feb. 4, 1958 M. HIMMELHEBER ET AL 2,822,028
METHOD OF MANUFACTURING WOOD PARTICLE BOARDS
Filed Jan. 16, 1956 4 Sheets-Sheet 2
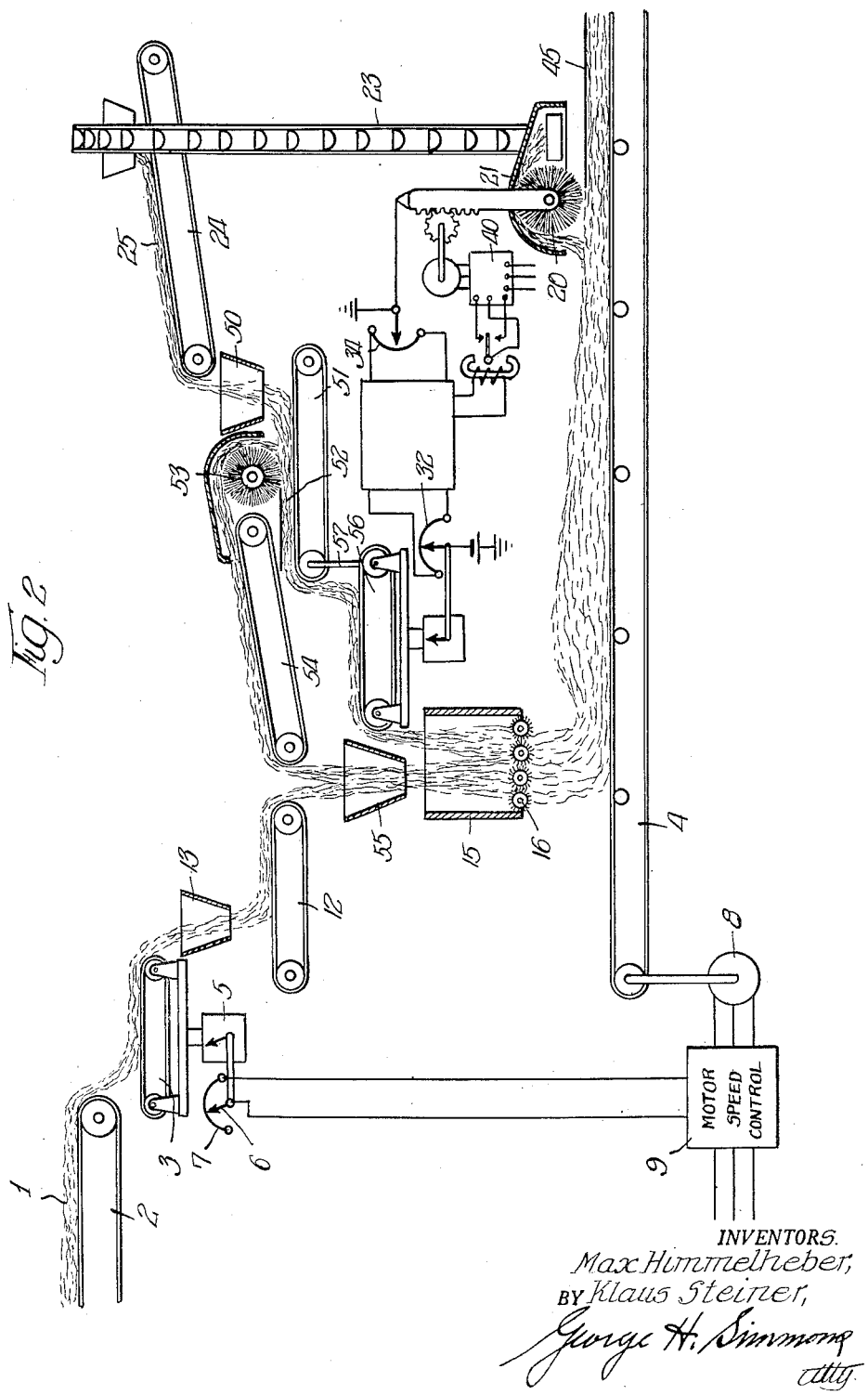
INVENTORS.
Max Himmelheber,
BY Klaus Steiner,
George H. Simmons
Atty.

Feb. 4, 1958   M. HIMMELHEBER ET AL   2,822,028
METHOD OF MANUFACTURING WOOD PARTICLE BOARDS
Filed Jan. 16, 1956   4 Sheets-Sheet 3
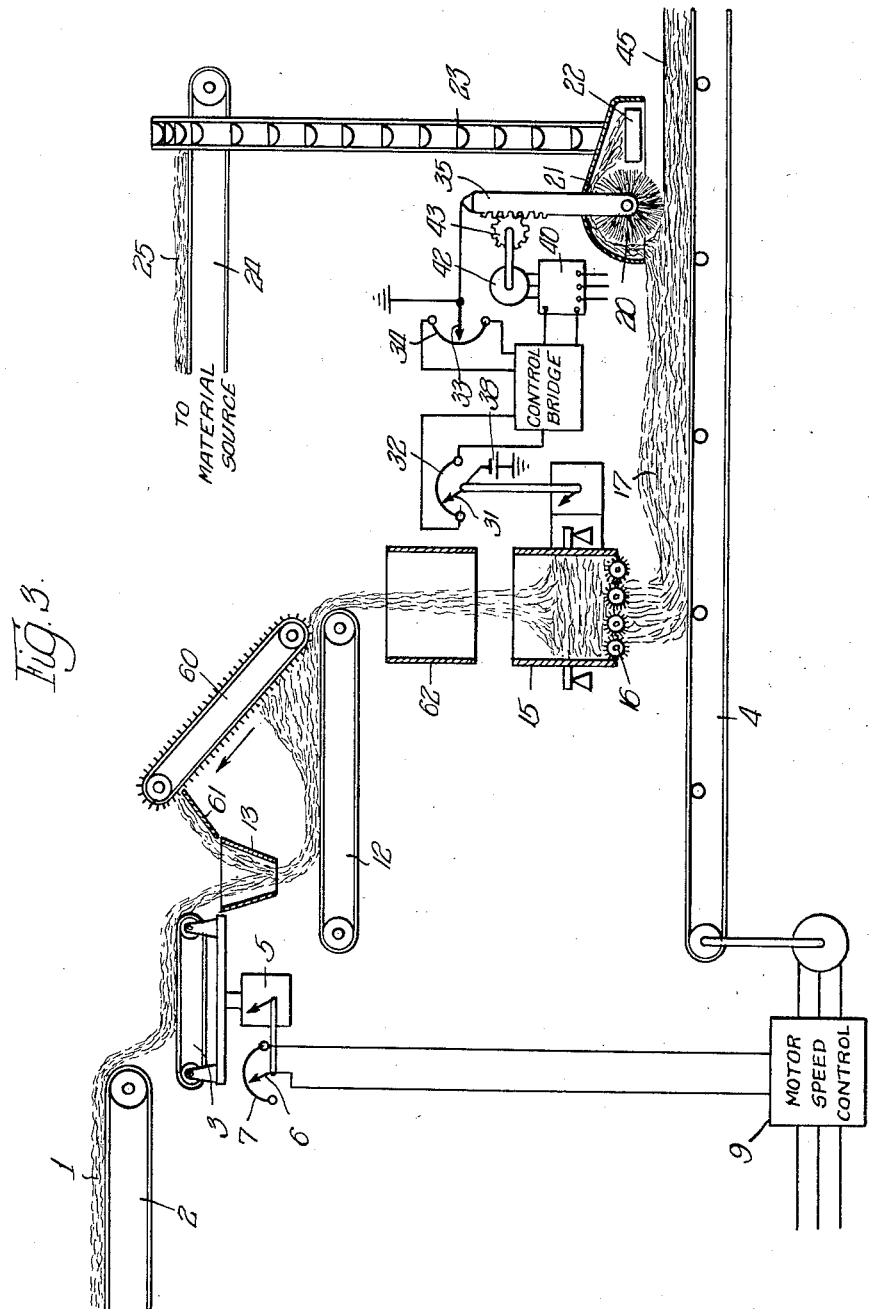
INVENTORS.
Max Himmelheber,
BY Klaus Steiner,
George H. Simmons
Atty

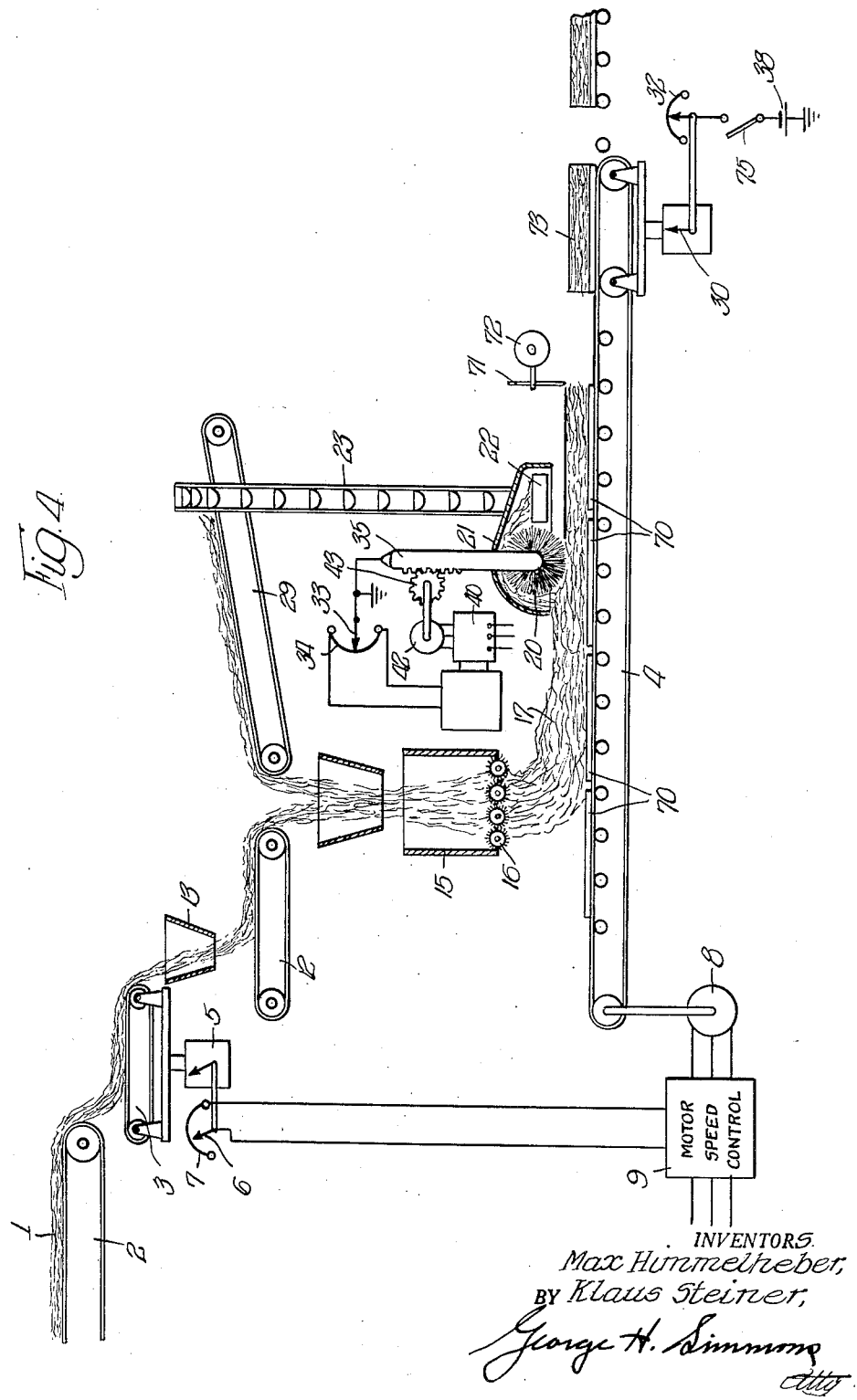

United States Patent Office 2,822,028
Patented Feb. 4, 1958

2,822,028

METHOD OF MANUFACTURING WOOD PARTICLE BOARDS

Max Himmelheber, Baiersbronn, Schwarzwald, and Klaus Steiner, Bad Tolz, Germany, assignors to Allwood, Inc., Glarus, Switzerland, a corporation of Switzerland Application January 16, 1956, Serial No. 559,447

6 Claims. (Cl. 154—29)

This invention relates to an improved method of manufacturing wood particle boards.

It is a main object of the invention to provide a method of forming wood particle boards having uniform weight per unit volume in a continuous process.

Another object of the invention is to provide a method of forming a continuously moving web of stock having uniform weight per unit of its area.

Another object of the invention is to provide a method of forming a continuously moving web of stock of uniform width, which method includes varying the thickness of the web in inverse ratio to the weight of a unit volume, thereby to achieve uniform weight per unit area of the web.

Further objects of the invention not specifically mentioned here will be apparent from the detailed description and claims which follow, reference being had to the accompanying drawings in which a preferred embodiment of the invention is shown by way of example and in which:

Fig. 1 is a diagrammatic view illustrating a preferred embodiment of the invention;

Fig. 2 is a view similar to Fig. 1, showing a modified embodiment of the invention;

Fig. 3 is a view similar to Figs. 1 and 2, showing still another embodiment of the invention; and Fig. 4 is a view similar to Figs. 1, 2 and 3, showing still another embodiment of the invention.

Particle boards made from finely comminuted wood or other fibrous materials impregnated with a binder or glue and compressed and heated to set the glue are known in the prior art of which we are aware.

In the manufacture of boards of this kind, it is necessary that the finished board be of uniform weight per unit area within fairly small allowable tolerances to fulfill the purposes for which the boards are intended.

The stock from which the boards are made is frequently gleaned from the waste materials of the lumber industries and may be composed of a variety of woods of different specific gravity. The stock may also be composed of other fibrous materials having different specific gravity from that of wood.

It will be readily apparent that with basic materials varying in weight per unit volume, volumetric control of the material going into a finished board will necessarily result in variations of the weight of that board per unit area in direct proportion to the weight of a unit volume of the basic stock. This results in variations in the weight of the board, which are greater than allowable tolerances.

Boards of this kind are sometimes manufactured in a batch process, in which process a quantity of the basic material stock which has been impregnated with the binder is placed in a form of such dimensions as to permit the manufacture of a board of desired dimensions and the stock is then compressed and heated to form the finished board. In such a process it is simple to control the weight of the finished product merely by weighing the stock prior to placing it in the form, it being obvious that if a uniform weight of stock is placed in the board, uniform weight of the board results.

More frequently boards of this type are manufactured in a so-called continuous process in which the previously impregnated stock is deposited in a continuous web, which web is cut into lengths corresponding to the board to be made and then the lengths or blanks are compressed and heated to form the finished board. Obviously the control of the weight per unit area of the board that is made in such a continuous process presents an entirely different problem from the control of the weight of the board made in a batch process. It is to the control of the weight per unit area of boards made in a continuous process that the present invention specifically relates.

In the practice of the present invention, the basic stock which has previously been impregnated with glue is moved in a continuous stream into the lay-up station in which the continuous web is made. Scales are employed to determine the weight per unit volume of the stock thus supplied to the system. The web formed is of uniform width and its thickness is varied in inverse ratio to the weight of a unit volume of the stock. By this method the weight of a unit area of the web will be maintained constant within tolerances small enough to be satisfactory, and as a result the board made from the blanks severed from the web will likewise have uniform weight per unit area within the same tolerances.

The weight per unit volume of the material can be determined in a number of ways within the teachings of the invention. Conceivably it might be advantageous to determine this weight at or immediately adjacent the point where the thickness of the web is controlled. Weight determination of the unit volume of material at this point presents problems, and complexity of arrangements for overcoming these problems negative the advantages to be gained from their solution. It has been found that satisfactory control of the weight per unit area of the finished board can be maintained within reasonable tolerances by determining the weight per unit volume of the material elsewhere than at or near the point of control of the thickness of the web.

After the weight per unit volume of the material is determined, control of the thickness of the web to produce uniform weight per unit area may likewise be achieved in a number of different ways within the teachings of the invention. This control may be manual if desired, but since such procedure would require frequent or constant attention of an operator it is less to be desired. Automatic control of the web thickness in inverse ratio to the weight of unit volume of the stock is preferable.

The invention will be best understood by reference to the accompanying drawings in which similar parts bear the same reference numerals throughout the figures. In Fig. 1, it will be seen that the previously impregnated finely comminuted particles of stock 1 are delivered into the system by suitable means such as a conveyor 2. The stock is delivered to a conveyor scale 3 at constant rate so that the conveyor at all times will contain the same volume of material within close tolerances. A main conveyor 4 which, within the teachings of the invention, may be a belt conveyor or a roller conveyor, a conveyor grate or the like, is driven in a forward direction, as indicated by the arrow, at a uniform rate of speed.

In accordance with the teachings of the invention, speed of conveyor 4 is controlled by the weight of the material on the scale conveyor 3. In the embodiment shown by way of example, the indicator 5 of the scale conveyor is connected to the movable arm 6 of the rheostat 7, moving that arm in synchronism with the movements of the indicator 5, thereby to control the speed of the motor 8, by which the conveyor 4 is driven, through a suitable speed control 9 of known design.

The material 1 moving off of the conveyor 3 is conveyed to a hopper 11, either directly, or, as will most frequently occur because of physical location of the apparatus in the system, through the medium of a conveyor 12, a suitable funnel or guide 13 being employed to direct the material from the scale conveyor 3 to the conveyor 12. The material thus delivered to the hopper 11 passes out of that hopper onto a second scale conveyor 14, the hopper 11 being spaced a fixed distance above the upper reach of the conveyor belt of conveyor 14 so as to deposit thereon a band of material of uniform width, thickness and length. Scale conveyor 14 continuously weighs this constantly moving band of material.

The material on the scale conveyor 14 is discharged into the hopper 15 of a spreading device 16. The material discharged from the device 16 to form on the conveyor 4 a web of material 17, which web is of uniform width and of thickness greater than required. Spreading device 16, shown in Fig. 1, is shown by way of example only as there are a number of known spreading devices which may be used. The details of construction and operation of the device form no part of the present invention. So long as the device functions to spread the material received into a moving web of uniform width and thickness, the requirements of this invention are met.

Located over the web is a stripper mechanism 20 of known design, which mechanism consists of a stiff bristle brush or a spiked drum that is driven in clockwise direction, as seen in Fig. 1, at constant speed. The stripper 20 removes excess material from the web 17, that material passing through a casing 21 that covers the stripper 20 onto a cross conveyor 22 where the material is carried to an elevator conveyor 23 that discharges onto a belt conveyor 24 which returns the excess material 25 to the hopper 11 where it is intermingled with the material flowing into that hopper from the conveyor 12.

From the foregoing it will be seen that the volume of material on conveyor scale 14 is made up of a mixture of stock originally entering the system from conveyor 2 and stock re-entering the system from conveyor. This mixture of stock is weighed continuously and the thickness of the web 17 controlled in inverse ratio to the weight of the mixture.

This control of the thickness of web 17 as a function of the weight of a constant volume of the stock entering the web may be achieved manually if desired, within the teachings of the invention. Such manual control requires frequent or constant attention of an operator who, noting the weight indicated by indicator 30 adjusts the stripper 20 accordingly. We prefer, however, to provide automatic control of the thickness of the web 17.

To accomplish such control, a number of arrangements may be used within the teachings of the invention. In the example shown, the indicator 30 of the scale conveyor 14 is connected to the movable arm 31 of a potentiometer 32, thereby to insure that the arm 31 will move in unison with the indicator. The movable arm 33 of a second potentiometer 34 is connected to the rack bar 35 that supports the stripper 20 over the web 17. Potentiometers 32 and 34 are connected together through resistances 36 and 37, forming a Wheatstone bridge to which power is supplied from a source 38 that is connected to the potentiometer arms 31 and 33. A polarized relay 39 is connected to the junctions of potentiometer 34 and resistance 36, and potentiometer 34 and resistance 32, the contacts of this relay being in turn connected to a motor control 40 of known design, power being supplied from a source 41. A motor 42 is connected to a pinion 43 that engages the rack 35, thereby to cause an operation of the motor to move the stripper 20.

Should the stock in the auxiliary band of material on scale conveyor 14 increase in weight, potentiometer arm 31 will be moved and the bridge will be unbalanced; consequently relay 39 will be operated to actuate the motor control and through it the motor, to drive that motor in a direction proper to lower the stripper 20. This movement of the rack 35 produces a corresponding movement of the potentiometer 33, the movement continuing until the bridge is again in balance, at which time the relay 39 falls back and the system comes to rest. The finish thickness of that portion 45 of the web to the right of the stripper 20 is thus reduced; and since the weight of the stock going into the web has increased, this reduction in the thickness of the web produces uniform weight per unit of area of the web within reasonable tolerances.

The embodiment of the invention diagrammatically illustrated in Fig. 1 is advantageous when the weight of the basic material 1 is subject to frequent variations.

In instances where the weight per unit volume of the basic material is more nearly constant, the embodiment of the invention shown in Fig. 2 may be advantageous.

As will be seen in Fig. 2, the incoming material 1 on conveyor 2 is discharged onto the scale conveyor 3, which through rheostat 7 controls the motor control 9, thereby to cause the motor 8 to drive the conveyor 4 at speed proper for the amount of material 1 delivered in unit time. The material discharged from the scale conveyor 3 is conveyed by a conveyor 12 directly to the hopper 15 of the spreader device 16 in this embodiment of the invention. The spreader device 16 lays up a web 17 of excessive thickness, as before, and the stripper 20 removes the excess material, depositing it on conveyor 22, which delivers it to elevator conveyor 23, which in turn delivers the material to the conveyor 24. The excess material 25 is thus deposited in a hopper 50 which is positioned over a conveyor 51 and deposits thereon a band of material 52 which is stripped to uniform thickness by a stripper 53 disposed at fixed distance above the conveyor 51 and driven at a constant speed. Excess material thus removed from the band by the stripper 53 is returned to the system; for example, it may be conveyed by conveyor 54 to a funnel or guide 55 that directs it into the hopper 15 of the lay-up device 16.

The uniform band of material on conveyor 51 is deposited on scale conveyor 56 which moves synchronously with the conveyor 51, as indicated by the tie 57, with the result that there will at all times be on the conveyor 56 a uniform volume of material. Conveyor 56 deposits this material in the hopper 15 of the lay-up mechanism 16.

The weight of the constant volume of material on the conveyor 56 governs the positioning of the stripper 20 by a control system which is identical with that shown in Fig. 1 and the details of which need not be here repeated.

Since the thickness of the finished web 45 in this embodiment of the invention is controlled solely by the weight of the excess material removed from the web 17, any abrupt variations in the weight per unit volume of the material 1 delivered to the system will be smoothed out and as a result the weight per unit area of the web 45 is maintained constant within allowable tolerances.

In Fig. 3 we have shown another arrangment for carrying out the teachings of the invention. In this embodiment incoming stock 1 is weighed on scale conveyor 3 as before and the speed of conveyor 4 controlled by this weight in the above manner. Scale conveyor 3 discharges the stock onto conveyor 12 over which a belt stripper 60 is disposed at fixed distance above the upper reach of the conveyor. Stripper 60 is driven in the direction indicated by the arrow and levels off the material to a web of constant width and thickness. Excess stock removed by stripper 50 is returned to the system; for example through chute 61 to the guide 13. This arrangement insures that discharge of material from conveyor will be at a constant rate in volume per unit time.

The material so discharged from conveyor 12 falls through a guide 62 into the hopper 15 of the spreader device 16. Since the material enters hopper 15 at a constant rate and leaves the hopper at a constant rate under the control of spreader 16, the volume of material in the hopper will be constant. The material in hopper 15 is weighed and the weight thus determined used to control the position of stripper 20 through the control bridge, as before. Excess material removed from web 17 by stripper 20 is conveyed by conveyors 22 and 23 to conveyor 24. The excess material 25 is returned to the system by conveyor 24 which may discharge the material into guide 13, but preferably returns the material to the source, not shown, from which material 1 is received.

Thus it will be seen that the embodiment of the invention shown in Fig. 3 controls the thickness of the web with a minimum of equipment and maintains the weight per unit area of the web constant within reasonable tolerances.

Within the teachings of the invention, the uniform weight per unit area of the web can be secured in still another manner. As will be seen from Fig. 4, incoming stock is delivered to the hopper 15 of the lay-up device 16 in manner identical with the arrangement shown in Fig. 2. The stripper 20 removes excess stock from the web 17 and through conveyors 22, 23 and 24, delivers that stock directly to the hopper 15. The web 17, being laid up on metallic cawls 70, is thus stripped to desired thickness and as the web passes to the right of the stripper 20 a traveling saw 71, driven by a motor 72, is registered with the junction of adjacent cawls 70 and cuts the web into blanks 73 which pass over a scale conveyor 74, thereby to weigh the cawl and blank 73. The weight of the cawl 70 being calibrated, the weight of the blank 73 is thus determined. Conveyor scale 74 controls a potentiometer 32. Potentiometer 34 is controlled by the rack of the stripper 20, as before. As soon as the weight of blank 73 is determined, switch 75 is closed to apply power from source 38 to the bridge circuit. The bridge functions as before to control motor 42 which drives the pinion 43 that meshes with the rack 35, thereby to position the stripper 20 under the control of the weight of the blank 73. The blank passes off of the scale conveyor 74 onto the next step in the process of forming the wood particle board.

From the foregoing it will be apparent that through the teachings of the present invention, uniform weight per unit area of the finished board is achieved through controlling the thickness of the web from which the boards are made as a function of the weight of a unit volume of the basic material from which the web is formed. The method of the present invention adapts itself to continuous process operation and results in a uniformity of weight of the finished product within tolerances much smaller than can be achieved through volumetric control.

While we have chosen to illustrate our invention by showing and describing a preferred embodiment of it, we have done so by way of example only, as there are many modifications and adaptations which can be made by one skilled in the art within the teachings of the invention.

Having thus complied with the statutes and shown and described a preferred embodiment of our invention, what we consider new and desire to have protected by Letters Patent is pointed out in the appended claims.

What we claim is:

1. The method of forming a continuously moving continuous horizontally disposed web from binder impregnated finely comminuted fibrous stock, which web is of uniform width and has uniform weight per unit of area, which comprises: weighing a mass of the stock of known volume; forming the stock into a uniformly moving web of uniform width and excessive vertical thickness; stripping stock from said web to reduce its vertical thickness; and adjusting the final thickness to which the web is thus stripped in inverse ratio to the weight of said mass of stock, thereby to produce uniform weight per unit area of web.

2. The method of forming a continuously moving continuous horizontally disposed web from binder impregnated finely comminuted fibrous stock, which web is of uniform width and has uniform weight per unit of area, which comprises: weighing a constant volume moving mass of stock; forming the stock into a uniformly moving web of uniform width and excessive vertical thickness; stripping stock from said web to reduce its vertical thickness; and adjusting the final thickness to which the web is thus stripped in inverse ratio to the weight of said mass of stock, thereby to produce uniform weight per unit area of web.

3. The method specified in claim 2, in which the web is formed solely from the stock passing through the moving mass of stock that is weighed.

4. The method specified in claim 2, in which the final thickness to which the web is automatically adjusted and the adjusting means is automatically controlled by the weight of the moving mass of stock.

5. The method specified in claim 4, in which the adjusting means is actuated by a reversible power drive and that drive is adjusted as to direction and amount of movement by means actuated by the weight of the moving mass of stock.

6. The method of forming a continuously moving continuous horizontally disposed web from binder impregnated finely comminuted fibrous stock, which web is of uniform width and has uniform weight per unit of area, which comprises: forming a moving band of stock that has constant volume; weighing said band of stock; forming the stock into a uniformly moving horizontal web of uniform width and excessive vertical thickness; stripping stock from said web to reduce its vertical thickness; and adjusting the final thickness to which the web is thus stripped in inverse ratio to the weight of said band of stock, thereby to produce uniform weight per unit area of web.

References Cited in the file of this patent

UNITED STATES PATENTS

| | | |
|---|---|---|
| 1,777,670 | Hausman | Oct. 7, 1930 |
| 2,261,655 | Lowe | Nov. 4, 1941 |
| 2,540,146 | Stober | Feb. 6, 1951 |
| 2,579,770 | Uschmann | Dec. 25, 1951 |
| 2,635,301 | Schubert et al. | Apr. 21, 1953 |
| 2,662,665 | Harper | Dec. 15, 1953 |
| 2,676,694 | Wyss et al. | Apr. 27, 1954 |
| 2,688,393 | Uschmann | Sept. 7, 1954 |
| 2,693,619 | Goss | Nov. 9, 1954 |
| 2,700,177 | Mottet | Jan. 25, 1955 |
| 2,726,922 | Merrill et al. | Dec. 13, 1955 |
| 2,737,997 | Himmelheber et al. | Mar. 13, 1956 |
| 2,743,758 | Uschmann | May 1, 1956 |
| 2,744,045 | Collins | May 1, 1956 |